United States Patent [19]

Wollar

[11] Patent Number: 4,865,280
[45] Date of Patent: Sep. 12, 1989

[54] ONE-PIECE WIRE RETAINER CLIP WITH EXPANDABLE FASTENER FOR SECURING ELONGATED MEMBERS TO A STRUCTURE

[75] Inventor: Burnell J. Wollar, Barrington, Ill.
[73] Assignee: Phillips Plastics Corporation, Phillips, Wis.
[21] Appl. No.: 276,011
[22] Filed: Nov. 25, 1988
[51] Int. Cl.4 ................................................. F16L 3/00
[52] U.S. Cl. ..................................... 248/68.1; 248/71; 248/74.1
[58] Field of Search ................ 248/68.1, 71, 73, 74.1, 248/74.4, 74.5, 314, 316.5, 316.6; 24/543

[56] References Cited

U.S. PATENT DOCUMENTS

| D. 234,204 | 1/1975 | Miller | 24/543 |
|---|---|---|---|
| 4,264,047 | 4/1981 | Nelson | 248/73 |
| 4,386,752 | 6/1983 | Pavlak | 24/543 |
| 4,669,688 | 6/1987 | Itoh | 24/543 |
| 4,700,913 | 10/1987 | Hirano | 24/543 |

FOREIGN PATENT DOCUMENTS

| 2524269 | 12/1976 | Fed. Rep. of Germany | 24/543 |
|---|---|---|---|
| 3441302 | 4/1986 | Fed. Rep. of Germany | 24/543 |
| 310777 | 5/1969 | Sweden | 248/68.1 |
| 1299592 | 12/1972 | United Kingdom | 248/71 |

Primary Examiner—Robert W. Gibson, Jr.
Assistant Examiner—Robert A. Olson
Attorney, Agent, or Firm—James E. Nilles; Thomas F. Kirby

[57] ABSTRACT

A one-piece molded plastic wire retainer clip, comprising first and second sections joined by a flexible hinge, is provided for supporting flexible, axially shiftable insulated electric wires on an automobile steering column. The first section comprises a first base member having a pair of upwardly projecting resilient bifurcated legs defining a slot having an opening for receiving wires laterally inserted thereinto. A hollow expandable fastener projects downwardly from the first base member for insertion into a mounting hole in the steering column. The second section comprises a second base member having a closure plate supported thereon which has an aperture for receiving the free ends of the legs. When the first section is swung from unlatched to latched position, the closure plate blocks the slot opening and secures the wires in the slot. First latches on the two base members and second latches on the legs and closure plate maintain the closure plate in blocking position. Screw-receiving holes in the two base plates align with the fastener bore when the two sections are in latched position to enable a screw to be inserted thereto to effect fastener expansion to secure the clip to the steering column and to maintain the base members in latched position. The screw also secures a protective shroud to the steering column.

7 Claims, 3 Drawing Sheets

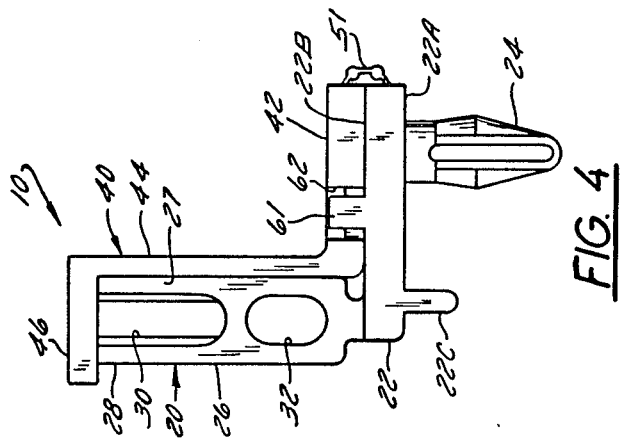
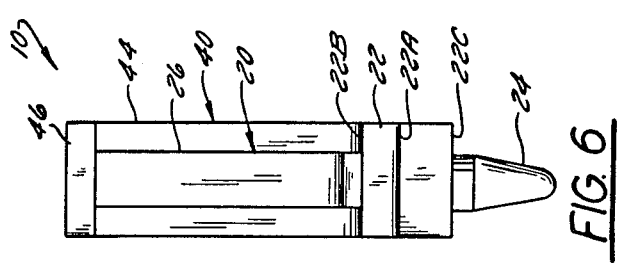
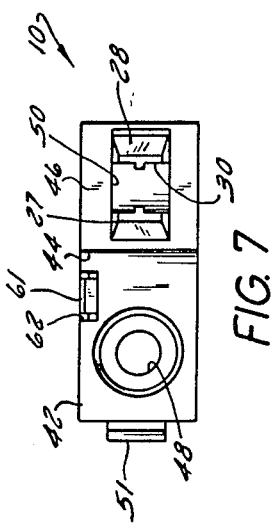
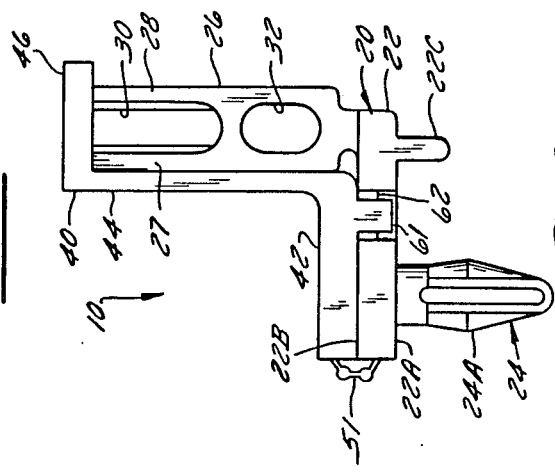
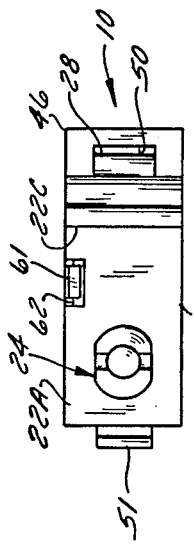
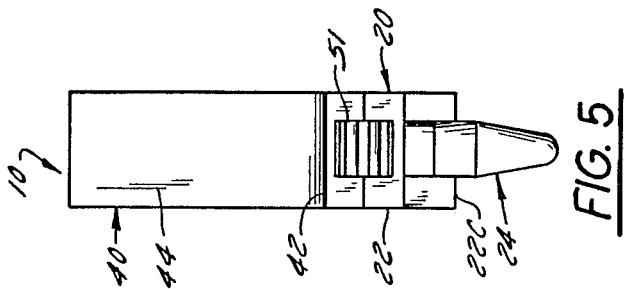

ONE-PIECE WIRE RETAINER CLIP WITH EXPANDABLE FASTENER FOR SECURING ELONGATED MEMBERS TO A STRUCTURE

BACKGROUND OF THE INVENTION

1. Field of Use

This invention relates generally to a one-piece, molded plastic retainer clip having an expandable fastener for securing it to a mounting hole in a structure, such as the steering column of an automobile, and having releasably latchable means for securing elongated members, such as electric wires or tubes, thereon.

2. Description of the Prior Art

Many types of equipment employ retainer clips to secure elongated members, such as electric wires or tubes, to a structure forming part of the equipment. Prior art retainer clips take various forms and are usually designed to suit particular needs. For example, one form of prior art clip comprises a simple curved band which is affixed to a structure by a screw which extends through the band and threads into a threaded mounting hole in the structure so as to tightly clamp the elongated member thereto. However, use of any form of clip employing a screw usually requires provision of a threaded mounting hole in the structure and adds to production costs. Furthermore, some prior art clips tightly clamp or grip the elongated member secured therein and prevent axial movement. However, prevention of axial movement of the elongated members may be disadvantageous or undesired in some types of equipment. Other types of prior art clips comprise several separate parts which must be selected by the user and manually assembled prior to or during installation and this also adds to production costs, especially in cases where many such clips must be installed. Multi-part clips are also more costly to fabricate, since separate dies and molding machines for each part are required. Some prior art clips presently in use on specialized types of equipment are not really well-suited therefor and result in a makeshift job.

For example, in the manufacture of automobiles prior art wire retainer clips are mounted on the steering column to support elongated flexible insulated electric wires which run from the engine compartment to electric control switches mounted on a movable (rotatable and/or tiltable) portion of the steering column, such as directional signal switches, air-bag switches and the like. The wires and prior art clips are concealed and protected by a metal or plastic shroud which is removably attached to the steering column by its own separate attachment means.

Multi-piece prior art clips and those secured by screws are difficult to install, especially in cases where the clips must be attached to the underside of the steering column. Furthermore, some prior art clips tightly grip the wires and, since portions of the wires must move axially and bend in response to turning or tilting motions of the steering column, the wires are eventually chaffed, damaged or broken. Removal of the shroud and prior art clips to enable servicing of damaged wires or associated faulty switches is time-consuming and costly.

It is desirable, therefore, to provide improved retainer clips for securing and supporting elongated members, such as wires or the like, on a structure, such as the steering column of an automobile, in order to expedite production, facilitate servicing, and reduce the labor and costs involved in both.

SUMMARY OF THE INVENTION

The present invention provides a retainer clip which is detachably mountable in an unthreaded mounting hole in a structure, such as the steering column of an automobile, to releasably and slidably secure and support elongated members, such as electric wires or the like, on the structure. The retainer clip in accordance with the invention is also usable to releasably attach a shroud to the steering column, which shroud surrounds the steering column and conceals and protects the wires and clip.

A retainer clip in accordance with the invention, which is a one-piece injection-molded plastic part, comprises two clip sections which are joined together by an integrally formed flexible hinge. The two clip sections are swingably movable relative to each other between an unlocked or unlatched position and a releasable locked or latched position.

One (first) clip section comprises a first base member or plate on which are supported a mounting means for securing the clip to the structure and a wire retainer means on which the elongated member is slidably and releasably supported. The mounting means comprises an integral expandable fastener located on the lower side of the base plate for insertion into an unthreaded mounting hole in the structure. The retainer means comprises a pair of upright bifurcated resilient legs located on the opposite or upper side of the base plate and defining a slot having an opening at one end for receiving the elongated member which is laterally inserted into the slot through the opening.

The other (second) clip section comprises a second base member or plate for supporting a closure member or plate having an aperture therein for receiving the free ends of the bifurcated legs when the clip sections are swung to latched position.

Each base plate of the two clip sections includes a pin-receiving hole therethrough. The hole in the first base member is aligned with a pin-receiving bore in the fastener. The hole in the second base member aligns with the hole in the first base member when the two clip sections are swung to latched position. These holes and the bore are adapted to receive a mounting pin which, when inserted in the bore, effects expansion of the fastener.

Releasable latching means are provided on the two clip sections to releasably maintain them in latched position when the clip sections are swung thereinto. The latching means comprise first interengageable latch means formed on the two base plates and second interengageable latch means formed on the legs and on the closure plate.

The retainer clip is employed as follows. Assuming the two clip sections are initially in unlatched position, an elongated member is manually inserted laterally through the opening and into the slot. Then, the two clip sections are manually swung together to latched position wherein the resilient free ends of the bifurcated legs enter the aperture in the closure plate and the latter closes or blocks the hole at the end of the slot so as to entrap the elongated member in the slot. As the two clip sections are moved into latched position, the first latch means on the base plates interengage and the second latch means on the legs and on the closure plate interengage. The retainer clip is slid along the elongated member so that the unexpanded fastener can be manually inserted into the mounting hole in the structure. The mounting pin is axially inserted through the aligned pin-receiving holes in the base plates and into the fastener bore to cause the fastener to expand and thereby releasably secure the clip to the steering column.

The clip is usable with or without a shroud. If a shroud is to be used, then, prior to pin insertion, the shroud is placed over the steering column and over the clip. A mounting hole in the shroud is aligned with the pin-receiving holes in the base plates and the pin is inserted therethrough to effect fastener expansion and to secure the shroud to the clip.

In the absence of a shroud and while the fastener is still inserted in the mounting hole on the structure and expanded, the latching means can be manually released so as to enable the second clip section to be swung to unlatched position wherein the closure plate is swung clear of the bifurcated legs and to enable the elongated member to be laterally removed from the slot for servicing and to allow the elongated members to be subsequently reinstalled or replaced. Thereafter, the second clip section is again swung to latched position. If a shroud is used, it is necessary to remove the pin in order to detach the shroud. In such a case, the clip can be unlatched, whether or not the unexpanded fastener is still in the mounting hole or is removed therefrom.

The pin comprises a head and a shank, which may be threaded or unthreaded. When installed, the pin head operates to secure the two base plates together and also to secure the shroud, if used, to the clip.

One or more elongated members may be inserted into the slot and the slot is sized and shaped to enable axial movement of the member(s) therein.

A retainer clip in accordance with the present invention offers several advantages over the prior art, especially when the structure is an automobile steering column and the elongated member is a wire. For example the slot in the clip enables the wire therein to shift axially in either direction in response to rotary or tilting movement of the movable portion of the steering column, thereby reducing or eliminating pulling and bending stresses on the wire. However, the clip also enables a wire to be held in a fixed position by the crush ribs provided between the bifurcated legs to reduce wire creep that causes undue stress at the connectors on the ends of the wire. The clip is usable alone or in combination with a shroud for the steering column, and the same pin which effects expansion of the fastener serves to keep both the clip and shroud firmly in place, yet simplifies installation and removal of both. If the clip is mounted upside down relative to a steering column or other support structure, the wires in the slot are prevented from falling out because the closure plate positively closes the opening of the slot. Furthermore, the latching means ensures that the closure plate blocks the slot opening even before the pin is inserted to effect fastener expansion, thereby facilitating handling of the clip and wires during installation or servicing. Once the pin is inserted, the pin head positively prevents movement of the clip to open position, even if the latching means themselves are released by vibration or are broken. Fabrication of the retainer clip as a one-piece part eliminates the need for the person performing the initial installation or subsequent service to search for and manually assemble two separate clip pieces, thereby saving time and reducing costs. Other objects and advantages of the invention will hereinafter appear.

DRAWINGS

FIGS. 3, 4, 5, 6, 7 and 8 are elevation views of the latched clip of FIG. 2 and show, respectively, one lateral side, the opposite lateral side, one end, the opposite end, the top side and the bottom side;

DESCRIPTION OF PREFERRED EMBODIMENTS

Figure 12:
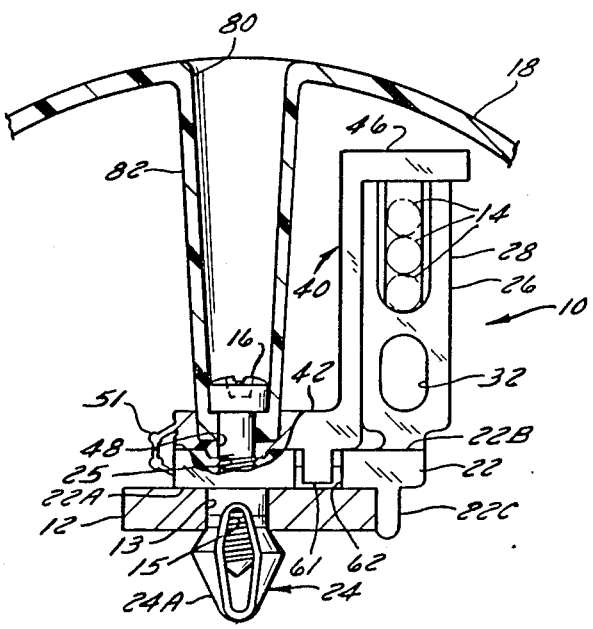
FIG. 12 is a view similar to FIG. 11 but showing a steering column shroud secured to the clip.

FIGS. 1 through 12 show a retainer clip 10 in accordance with the present invention which is detachably mountable on a structure, such as a portion of a steering column 12 of an automobile, to releasably and slidably secure and support elongated members, such as electric wires 14, on the steering column. As FIG. 12 shows, retainer clip 10 is also usable to releasably attach to steering column 12 a shroud 18 which surrounds steering column 12 to conceal and protect the clip 10 and wires 14.

Figure 1:
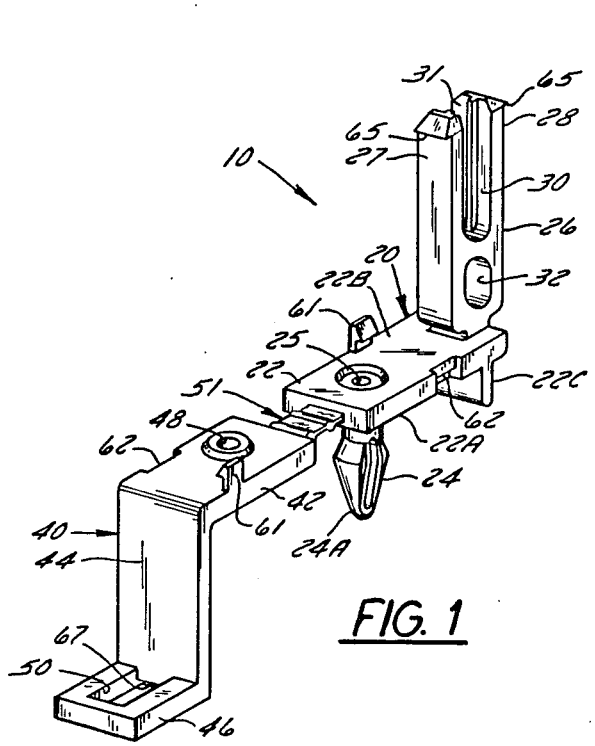
FIG. 1 is a perspective view of a wire retainer clip according to the present invention showing it in unlatched position or condition.
Figure 9:
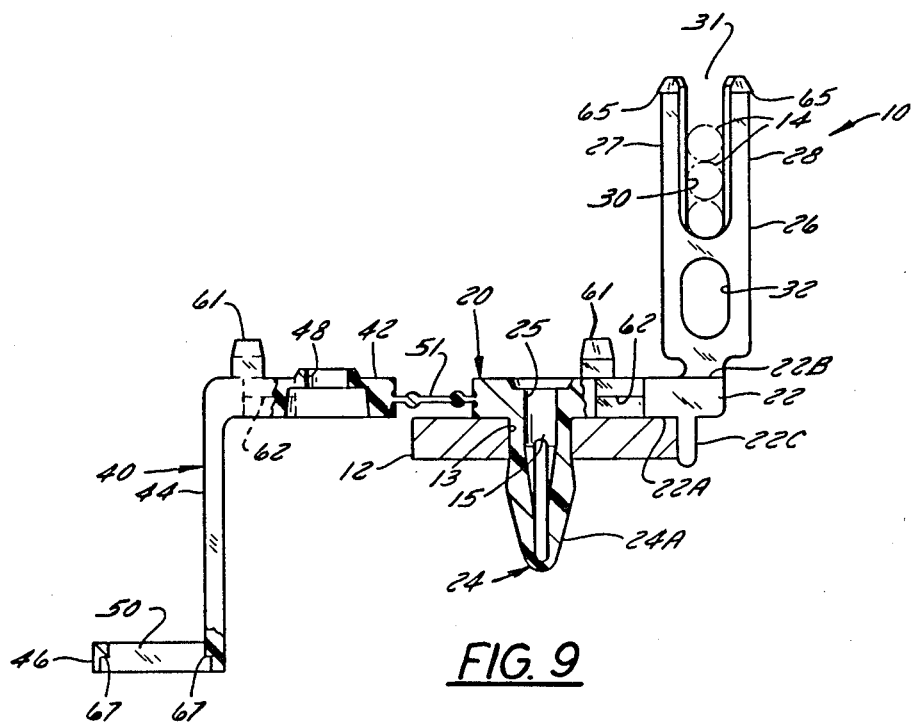
FIG. 9 is a view, partly in cross-section, of the unlatched clip and take on line 9—9 of FIG. 1.
Figure 11:
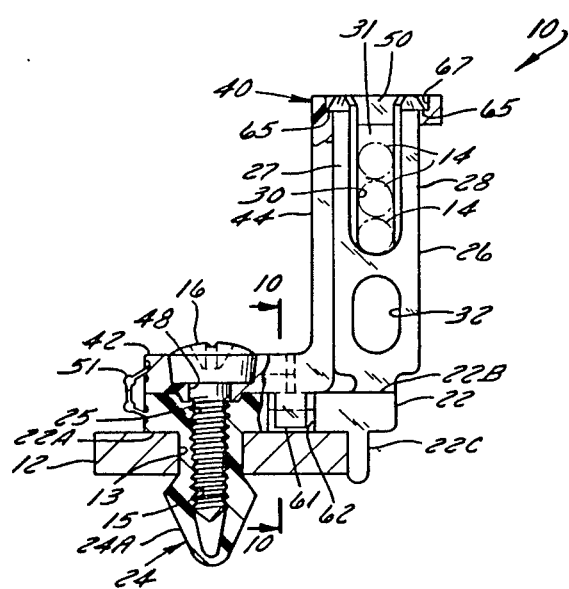
FIG. 11 is a view, partly in cross-section, of the latched clip with wires disposed therein and fully-installed by means of a pin, in the form, of a threaded screw, on a structure to which the wires are secured.

Retaining clip 10 is shown in unlatched condition in FIGS. 1 and 9 and in latched condition in FIGS. 2 through 8. FIGS. 11 and 12 show retaining clip 10 in latched condition and fully but detachably mounted on steering column 12 which has a mounting hole 13 therein, and releasably securing three flexible insulated electric wires 14 to the steering column. As FIGS. 11 and 12 show, a pin in the form of a screw 16 is associated with clip 10 to secure the clip to steering column 12. FIG. 12 shows that screw 16 is also used to secure optionally usable steering column shroud 18 to clip 10 on steering column 12, as hereinafter explained in detail.

Figure 2:
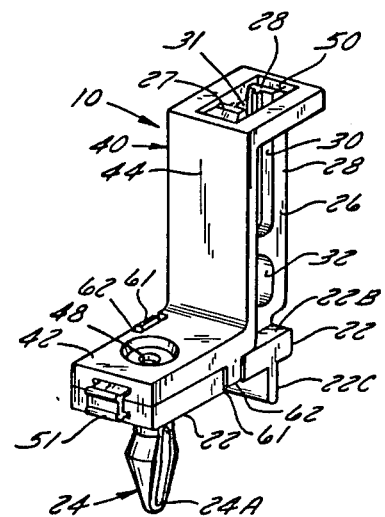
FIG. 2 is a view similar to FIG. 1 but showing the clip in latched position or condition.

Clip 10 is fabricated of plastic, such as nylon, in one piece by a process of injection molding. Clip 10 comprises two sections, namely, a first section 20 and a second section 40, which are joined together by an integrally-formed, web-like flexible member or hinge 51 which enables the two sections 20 and 40 to be swung or moved relative to each other between an open or unlatched position (FIG. 1) and a closed or latched position (FIG. 2).

First clip section 20 comprises a first base plate or member 22 for supporting on its lower side 22A, a mounting means 24 for securing clip 10 to steering column 12 and for supporting on its upper side 22B a wire retainer means 26. The mounting means 24 comprises an integral expandable fastener 24A located on one (lower) side 22A of base plate 22 for insertion into mounting hole 13 in steering column 12. Fastener 24A has a pin-receiving bore 15 therethrough for receiving screw 16 which effects expansion of the fastener (compare FIGS. 9 and 11). The wire retainer means 26 comprises a pair of upright spaced apart bifurcated resilient legs 27 and 28 located on the opposite (upper) side 22B of base plate 22 and defining a wire-receiving slot 30 having an opening 31 at one end for receiving wires 14 laterally inserted into the slot. Wire retainer means 26 has a reliever hole 32 therein to conserve plastic material.

First section 20 is also provided with an anti-rotation tab 22C which projects downwardly from the lower side 22A of first base plate 22 and engages an edge or shoulder on steering column 12 so as to prevent rotational movement of clip 10 about the axis of fastener 24A in response to shifting movement of the wires 14 and thereby ensure that the wires can easily slide axially in slot 30 when required to do so.

Clip section 40 comprises a base plate or member 42 for supporting a closure plate or wire trapping plate 46 having an aperture 50 therethrough for receiving the free ends of the bifurcated legs 27 and 28. Closure plate 46 is mounted on and projects laterally from a support member 44 which projects from base plate 42.

Base plates 22 and 42 of the two clip sections 20 and 40, respectively, include pin-receiving holes 25 and 48, respectively, therethrough and these holes are aligned with a pin-receiving bore 15 in fastener 24A when the two clip sections 20 and 40 are in latched position.

When clip section 40 is swung from unlatched position (FIG. 1) to latched position (FIG. 2), base plate 42 of locking section 40 overlies upper side 22B of ase plate 22 of base section 20 and the two pin-receiving holes 25 and 48 are aligned with each other and with fastener bore 15. Support member 44 of locking section 40 is disposed alongside the bifurcated wire retainer member 26 of base section 20. Aperture 50 of closure plate 46 receives the free ends of the legs 27 and 28 of bifurcated wire retainer member 26 so as to close opening 31 at the end of wire-receiving slot 30.

Latching means are provided on the two clip sections 20 and 40 to releasably maintain them in the locked position into which the clip sections are moved. The latching means comprise first interengageable latch means or latches on the two base plates 22 and 42 and second interengageable latch means or latches on the legs 27 and 28 and on closure plate 46.

Figure 10:
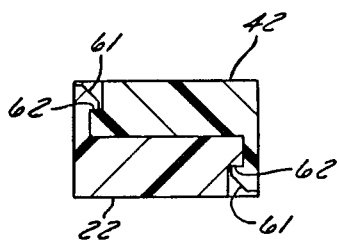
FIG. 10 is an enlarged cross-section view of a first latch means taken on line 10—10 of FIG. 11.

The first latches releasably secure the base plates 22 and 42 together and comprise a flexible resilient tab 61 on each plate 22, 42 which releasably engages a detent 62 formed on an edge of each plate 22, 42, as FIG. 10 shows.

The second latches releasably secure closure plate 46 to the legs 27 and 28 and comprise a flange 65 on the free end of each resilient leg 27 and 28 which releasably engages a sharp edge 67 on a side edge of aperture 50 in closure plate 46, as FIG. 11 shows.

Clip 10 is employed as follows. In one mode of installation, clip 10 is first mounted on structure 12 by insertion of its fastener 24A into mounting hole 13 and then the wires 14 (already located nearby, for example) are laterally inserted, one at a time, through opening 31 into slot 30. In another mode of installation, the wires 14 are first inserted into slot 30 through opening 31 and then clip 10 is slid along the wires to a location whereat fastener 24A can be inserted into mounting hole 13.

Assume that the two clip sections 20 and 40 are initially in unlatched position and that the wires 14 have been manually inserted laterally through opening 31 into slot 30. Then, clip section 20 is swung to latched or closed position wherein the free ends of the bifurcated resilient legs 27 and 28 enter aperture 50 in closure plate 46 and the closure plate blocks opening 31 at the end of slot 30 so as to entrap the wires 14 in the slot. As the two clip sections 20 and 40 move relative to each other into latched position, the first latches, namely, tabs 61 and detents 62 on each of the two base plates 22 and 42 interengage each other. Furthermore, the second latches, namely, flanges 65 on legs 27 and 28 and the edges 67 on closure plate 46 interengage.

If not already disposed therein, the unexpanded fastener 24A is then inserted into mounting hole 13 in steering column 12.

Clip 10 is usable with or without shroud 18, as FIGS. 12 and 11, respectively, show.

As FIG. 11 shows, if no shroud 18 is used, screw 16 may be inserted directly into aligned holes 25 and 48 and into bore 15 to effect expansion of fastener 24A. Screw 16 is inserted by axially pushing or screwing it into bore 15.

As FIG. 12 shows, if shroud 18 is used, prior to insertion of screw 16, shroud 18 is placed over steering column 12 and over clip 10. Mounting screw 16 is axially inserted through a mounting hole 80 in a stud 82 on shroud 18, through the aligned pin-receiving holes 25 and 48 in the base plates 22 and 42, respectively, and into fastener bore 15 to cause fastener 24A to expand and thereby secure shroud 18 and clip 10 to steering column 12.

When screw 16 is removed, as by rotation in a conventional manner, the latching means can be manually released so as to enable closure plate 46 to be swung clear of the bifurcated legs 27 and 28 and enable the wires 14 to be removed from slot 30 for servicing and subsequently to allow the wires to be reinstalled or replaced. Thereafter, the two clip sections 20 and 40 are again placed in latched position, the shroud 18, if used, is repositioned in its proper location, and screw 16 is re-inserted as above described.

Clip 10 can be installed in any position and will securely retain the wires 14 therein. In some cases clip 10 is installed on the underside of steering column 12 and the opening 31 of slot 30 faces downwardly but there is no possibility that the that the wires 14 can fall out through opening 31 which is positively closed by lock plate 46.

It is to be understood that, while clip 10 is especially well-adapted to support movable electric wires or the like, it could be employed to support a rigid, non-movable solid or tubular elongated member, such as a rod or a fluid line, for example.

I claim:

1. A one-piece plastic retainer clip for securing an elongated member to a structure having a mounting hole therein comprising:

a first section comprising a first base member and an expandable fastener mounted on said first base member for insertion into said mounting hole and having a pin-receiving bore therein for receiving a pin which effects expansion of said fastener, said first section further comprising a pair of resilient spaced apart legs mounted on said first base member and defining a slot having an opening to enable lateral insertion of said elongated member thereinto;

a second section comprising a second base member and a closure member mounted on said second base member and having an aperture therein for receiving said legs;

anti-rotation means comprising a projection mounted on said first section and engageable with said structure to prevent rotation of said clip about said fastener relative to said structure;

interengageable releasable latch means on the first and second sections, said latch means comprising interengageable first latches on said first and second base members, said latch means further comprising interengageable second latches on said closure member and on said legs, and hinge means connected between the base members of the first and second sections to enable said second section to be swung relative to said first section between an unlatched position and a latched position wherein said legs extend through said aperture in said closure member, wherein said closure member blocks said opening and wherein said latch means are engaged, said first base member comprising a first pin-receiving hole aligned with said bore in said fastener, said second base member comprising a second pin-receiving hole which aligns with said first pin-receiving hole when said second section is in said latched position whereby said pin, when inserted through the pin-receiving holes into said bore to effect expansion of said fastener, also operates to secure said sections together in latched position.

2. In combination:
an elongated member;
a structure having a mounting hole therein;
a retainer clip for securing said elongated member to said structure and comprising an expandable fastener having a bore therein inserted in said mounting hole;
a shroud overlying said structure and said retainer clip and having a pin-receiving hole therein;
and pin means inserted in said pin-receiving hole in said shroud and in said bore and operable to effect expansion of said fastener in said mounting hole in said structure and to secure said shroud to said retainer clip.

3. A combination according to claim 2 wherein said retainer clip comprises:
a first section on which are mounted said fastener and means defining a slot having an opening and in which said elongated member is disposed,
second section on which is mounted a closure member for said opening,
and hinge means connected between said first section and said second section to enable said second section to move relative to said first section between an open position and a closed position wherein said closure member blocks said opening to said slot;
said first section having a first pin-receiving hole therein which is aligned with said bore of said fastener,
said second section having a second pin-receiving hole which is aligned with said first pin-receiving hole when said second section is in closed position;
and wherein said pin means extends through said pin-receiving hole in said shroud and through the first and second pin-receiving holes in said clip and into said bore in said fastener to thereby maintain the first and second sections in closed position and to secure said shroud to said clip.

4. A combination according to claim 3 wherein said clip further comprises releasable latching means on said first and second sections to maintain said second section in said closed position after said pin means and said shroud are detached.

5. A combination according to claim 2 or 3 or 4 wherein said clip further comprises anti-rotation means thereon engageable with said structure to prevent rotation of said clip about said fastener relative to said structure.

6. A combination according to claim 2 or 3 or 4 wherein said structure is an automobile steering column, wherein said elongated member is a flexible wire, and wherein said clip is fabricated of plastic.

7. A one-piece plastic retainer clip (10) for releasably securing an elongated member (14) to a structure (12) having a surface with a mounting hole (13) therein comprising:
(A) a first section (20) comprising:
(1) a first base member (22) having a lower side (22A) for confronting said surface and an upper side (22B),
(2) an expandable fastener (24A) mounted on said lower side (22A) for insertion into said mounting hole (13),
(a) said first section (20) being provided with a member-receiving bore (15, 25) extending through said first base member (22) and into said expandable fastener (24A),
(3) an anti-rotation member (22C) mounted on and extending downwardly from said lower side (22A) for engagement with said structure (12) to prevent rotation of said clip (10) about said fastener (24A) relative to said structure (12),
(4) and a pair of resilient legs (27, 28) mounted on and extending upwardly from said upper side (22B) and defining a slot (30) having an opening (31) at its upper end for receiving said elongated member (14) insertable laterally thereinto;
(B) a second section (40) comprising:
(1) a second base member (42) having a first side and a second side,
(a) said second section (40) being provided with a second member-receiving bore (48) which extends through said second base member (42),
(2) a support member (44) mounted on and extending from said first side,
(3) and a closure plate (46) mounted on and projecting laterally from said support member (44),
(a) said closure plate (46) being provided with an aperture (50) for receiving the upper ends of said pair of legs (27, 28);
(C) hinge means (51) connected between said base member (22) and said second base member (42) to enable said second section (40) to be swung relative to said first section (20) between an unlatched position and a latched position wherein:
(1) said second side of said second base member (42) confronts said upper side (22B) of said base member (22),
(2) wherein said upper ends of said pair of resilient legs (27, 28) extend through said aperture (50) and said closure plate (46) blocks said opening (31) of said slot (30),
(3) and wherein said second member-receiving bore (48) registers with said member-receiving bore (15, 25) extending through said base member (22),
(D) and interengageable latch means for releasably securing said second section (40) in said latched position and comprising:
(1) interengageable first latches (61, 62) on said first base member (22) and on said second base member (42),
(2) and interengageable second latches (65, 67) on said pair of resilient legs (27, 28) and on said closure plate (46).

* * * * *